United States Patent
Kim et al.

(10) Patent No.: US 11,415,836 B2
(45) Date of Patent: Aug. 16, 2022

(54) POLARIZING PLATE AND DISPLAY DEVICE

(71) Applicant: LG CHEM, LTD., Seoul (KR)

(72) Inventors: Tae Woo Kim, Daejeon (KR); Jin Yong Park, Daejeon (KR); Won Chul Lee, Daejeon (KR); Jun Cheol Shin, Daejeon (KR); Ki Jun Jung, Daejeon (KR); Jae Min Choi, Daejeon (KR)

(73) Assignee: Shanjin Optoelectronics (Suzhou) Co., Ltd.

(*) Notice: Subject to any disclaimer, the term of this patent is extended or adjusted under 35 U.S.C. 154(b) by 0 days.

(21) Appl. No.: 16/962,191

(22) PCT Filed: Mar. 27, 2019

(86) PCT No.: PCT/KR2019/003561
§ 371 (c)(1),
(2) Date: Jul. 14, 2020

(87) PCT Pub. No.: WO2019/190190
PCT Pub. Date: Oct. 3, 2019

(65) Prior Publication Data
US 2020/0341316 A1     Oct. 29, 2020

(30) Foreign Application Priority Data

Mar. 28, 2018  (KR) .................. 10-2018-0035682

(51) Int. Cl.
| | | |
|---|---|---|
| G02F 1/13363 | (2006.01) | |
| G02B 5/30 | (2006.01) | |
| G02B 1/14 | (2015.01) | |
| G02F 1/1335 | (2006.01) | |

(52) U.S. Cl.
CPC .......... *G02F 1/13363* (2013.01); *G02B 1/14* (2015.01); *G02B 5/3083* (2013.01); *G02F 1/133528* (2013.01)

(58) Field of Classification Search
CPC .......... G02B 5/3083; G02B 1/14; G02B 5/30; G02B 27/28; G02F 1/13363; G02F 1/133528
See application file for complete search history.

(56) References Cited

U.S. PATENT DOCUMENTS

| | | |
|---|---|---|
| 7,695,780 B2 | 4/2010 | Ohgaru et al. |
| 9,358,768 B2 | 6/2016 | Shin et al. |
| 9,989,688 B2 | 6/2018 | Kuroda |
| 2008/0069973 A1 | 3/2008 | Nitta et al. |
| 2009/0027599 A1* | 1/2009 | Ohgaru ............. G02B 1/04 349/96 |
| 2011/0013115 A1* | 1/2011 | Kajita ............. G02F 1/133528 349/61 |

(Continued)

FOREIGN PATENT DOCUMENTS

| | | |
|---|---|---|
| CN | 103869401 | 6/2014 |
| CN | 104508544 | 4/2015 |

(Continued)

*Primary Examiner* — Mariam Qureshi

(57) ABSTRACT

Provided is a polarizing plate and a display device. The polarizing plate has excellent durability against an external environment, for example, moisture, due to a protective film of a polarizer, and can prevent color distortion upon observation with polarized sunglasses, and a display device comprising the polarizing plate.

7 Claims, 3 Drawing Sheets

(56) References Cited

U.S. PATENT DOCUMENTS

| | | | |
|---|---|---|---|
| 2012/0113356 A1* | 5/2012 | Yu | G02F 1/133528 349/62 |
| 2013/0029122 A1 | 1/2013 | Fukagawa et al. | |
| 2014/0168767 A1 | 6/2014 | Shin et al. | |
| 2015/0131038 A1* | 5/2015 | Ishiguro | G02F 1/134363 349/96 |
| 2015/0212368 A1 | 7/2015 | Yonemoto et al. | |
| 2016/0341860 A1* | 11/2016 | Nojiri | G02B 5/3033 |
| 2016/0370523 A1 | 12/2016 | Shimoju et al. | |
| 2018/0046299 A1 | 2/2018 | Nakai et al. | |
| 2018/0356564 A1* | 12/2018 | Jeong | B29C 55/143 |
| 2020/0326587 A1* | 10/2020 | Heo | B29C 55/06 |

FOREIGN PATENT DOCUMENTS

| | | |
|---|---|---|
| JP | 2006-293331 | 10/2006 |
| JP | 2011-053271 | 3/2011 |
| JP | 2013-028755 | 2/2013 |
| JP | 2015-111208 | 6/2015 |
| JP | 2015-180912 | 10/2015 |
| JP | 2016-143046 | 8/2016 |
| JP | 2019-168690 | 10/2019 |
| KR | 10-2007-0059096 | 6/2007 |
| KR | 10-1177327 | 8/2012 |
| KR | 10-2015-0037448 | 4/2015 |
| KR | 10-2015-0100843 | 9/2015 |
| KR | 10-2016-0076701 | 7/2016 |
| KR | 10-2017-0097921 | 8/2017 |
| KR | 10-1768253 | 8/2017 |
| KR | 10-2017-0122979 | 11/2017 |
| WO | 2014-057949 | 4/2014 |
| WO | 2016-167221 | 10/2016 |
| WO | 2017-170211 | 10/2017 |
| WO | 2017-209473 | 12/2017 |
| WO | 2018-168306 | 9/2018 |

\* cited by examiner

[Figure 1]
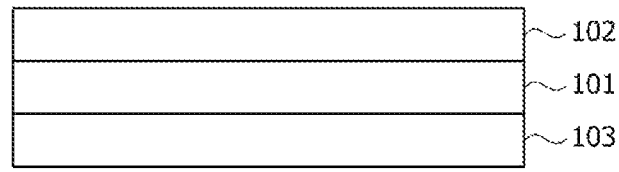
[Figure 2]
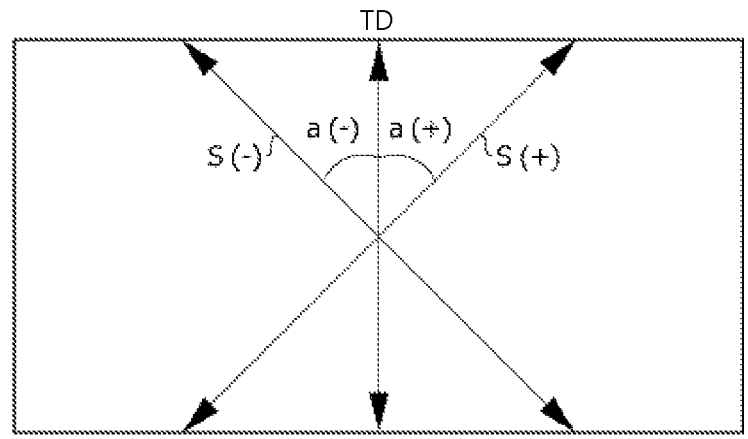
[Figure 3]
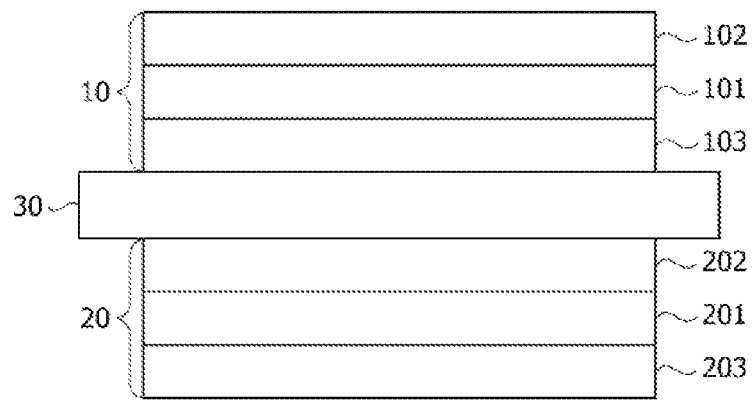

[Figure 4]
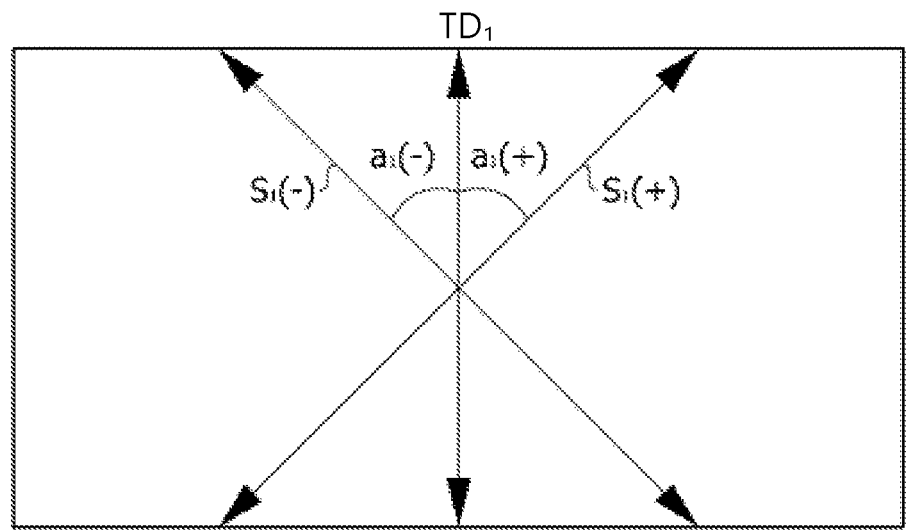
[Figure 5]
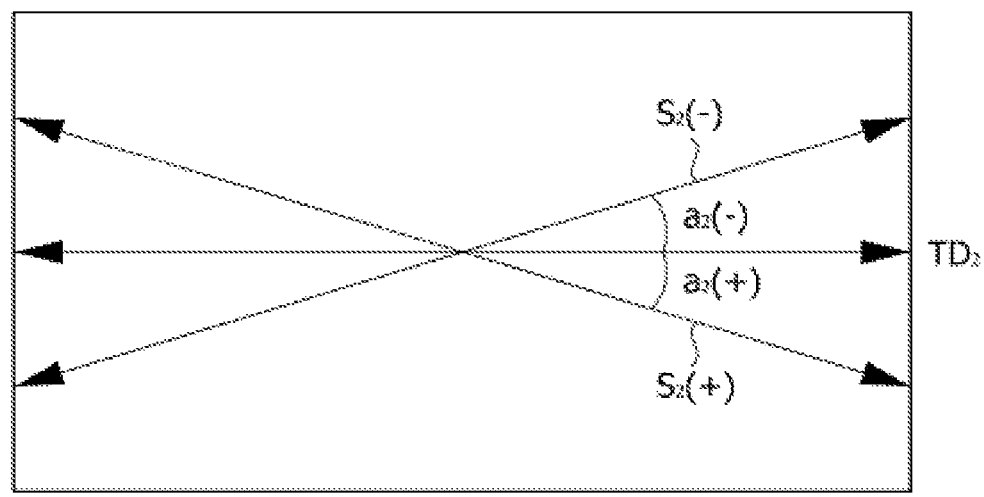

[Figure 6]
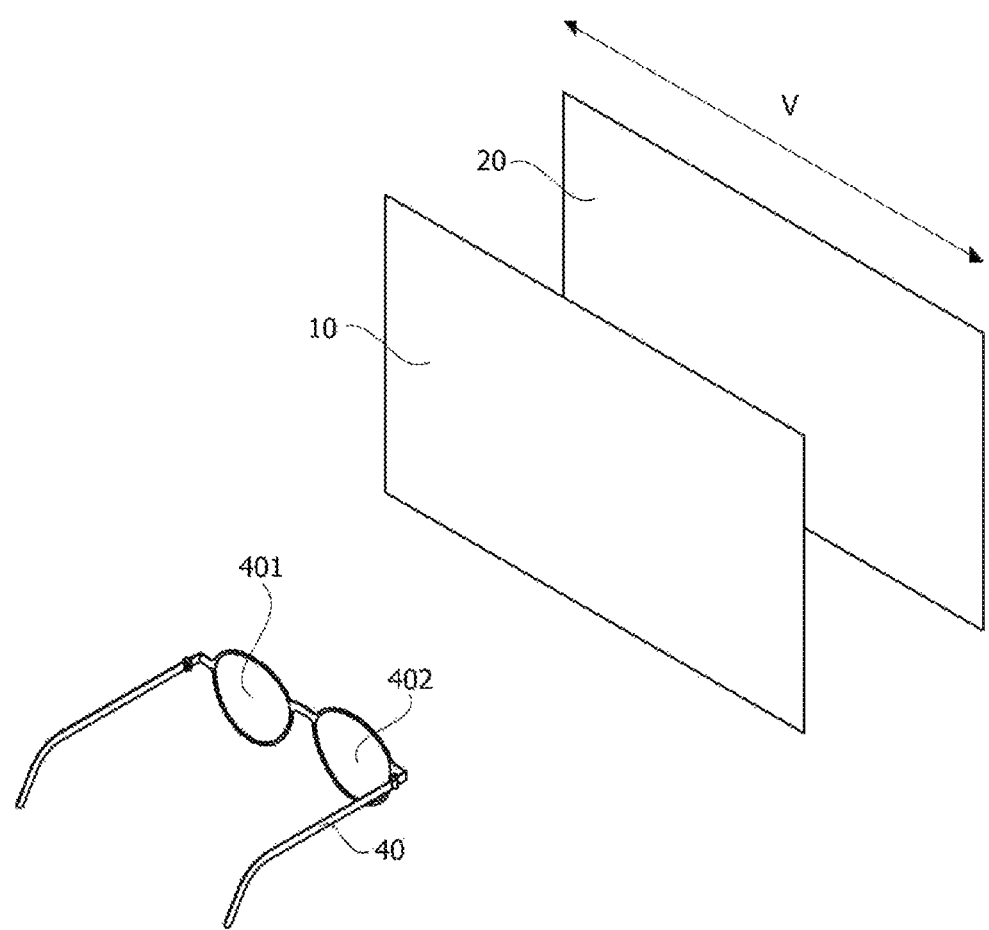

POLARIZING PLATE AND DISPLAY DEVICE

CROSS-REFERENCE TO RELATED APPLICATION(S)

This application is a National Stage Application of International Application No. PCT/KR2019/003561 filed on Mar. 27, 2019, which claims the benefit of priority based on Korean Patent Application No. 10-2018-0035682 filed on Mar. 28, 2018, the disclosure of which is incorporated herein by reference in its entirety.

TECHNICAL FIELD

The present application relates to a polarizing plate and a display device.

BACKGROUND

For a polarizer used in a display device, a protective film for protecting the polarizer is used. The protective film of the polarizer can serve to prevent damage of the polarizer from the outside. The polarizer has a problem of poor performance at the time of contact with moisture, where the protective film of the polarizer also serves to block moisture. Recently, as a low moisture-permeable base material having excellent moisture barrier abilities, for example, a PET (polyethylene terephthalate) film or an acrylic film, and the like has been adopted and used in the polarizer protective film.

In the case of the PET film of the low moisture-permeable base materials, it has excellent moisture barrier performance as compared with the acrylic film, but has the following problems. Nowadays, leisure activities have been increased due to improvement of living standards, and thus when the polarizer applied with the PET protective film is observed by a person who is wearing polarized sunglasses used for outdoor activities such as fishing and skiing, the person may view rainbow patterns on the screen of the display device and a phenomenon may occur which interferes with the color implementation of the display device to be originally implemented (Patent Document 1: Korean Patent Laid-Open Publication No. 10-2015-0037448).

DISCLOSURE

Technical Problem

The present application provides a polarizing plate which has excellent durability against external environment, for example, moisture, due to a protective film of a polarizer, and is capable of preventing color distortion upon observation with polarized sunglasses, and a display device comprising the polarizing plate.

Technical Solution

The present application relates to a polarizing plate. FIG. 1 exemplarily shows the polarizing plate of the present application. As shown in FIG. 1, the polarizing plate can comprise a first protective film (102), a polarizer (101) and a second protective film (103) sequentially. That is, the first protective film (102) and the second protective film (103) can be disposed on both sides of the polarizer (101), respectively.

In this specification, the term polarizer means a film, sheet or element having a polarization function. The polarizer is a functional element capable of extracting light that vibrates in one direction from incident light that vibrates in various directions.

The polarizer can be an absorbing polarizer. In this specification, the absorbing polarizer means an element exhibiting selective transmission and absorption characteristics with respect to incident light. The polarizer can be a linear polarizer. The absorbing polarizer can transmit light that vibrates in one direction from incident light that vibrates in various directions, and absorb light that vibrates in the other directions.

The polarizer can be a linear polarizer. In this specification, the linear polarizer means a polarizer, wherein the selectively transmitting light is linearly polarized light that vibrates in any one direction, and the selectively absorbing light is linearly polarized light that vibrates in a direction orthogonal to the vibration direction of the linearly polarized light.

As the polarizer, for example, a polarizer in which iodine is dyed on a polymer stretched film such as a PVA stretched film, or a guest-host polarizer in which liquid crystals polymerized in an oriented state are used as a host, and anisotropic dyes arranged in accordance with the orientation of the liquid crystals are used as a guest can be used, without being limited thereto.

According to one example of the present application, a PVA stretched film can be used as the polarizer. The transmittance and the polarization degree of the polarizer can be appropriately adjusted in consideration of the object of the present application. For example, the transmittance of the polarizer can be 41.5% to 55%, and the polarization degree of the polarizer can be from 65% to 99.9999%.

At least one protective film of the first protective film and the second protective film can have an angle in a range of 0 to 4.5 degrees as formed by the slow axis of the protective film with respect to the TD (transverse direction) axis. Through the use of the protective film having such a relationship between the TD axis and the slow axis, it is possible to prevent the color distortion upon observation of the display device through polarized sunglasses. In this specification, the protective film having the relationship between the TD axis and the slow axis can be referred to as "a protective film for preventing color distortion."

FIG. 2 exemplarily shows the relationship of the angle formed by the slow axis of a protective film for preventing color distortion with respect to the TD axis. In FIG. 2, the angle a(+) denotes an angle formed by the slow axis (S(+)) in the clockwise direction with respect to the TD axis (TD), the angle a(−) denotes an angle formed by the slow axis (S(−)) in the counterclockwise direction with respect to the TD axis (TD).

In this specification, an angle formed by the slow axis in the clockwise direction with respect to the reference axis (for example, TD axis) can be represented by a "+" sign, and an angle formed in the counterclockwise direction can be represented by a "−" sign. In this specification, when describing an angle and not specifically designating the sign or direction of the angle, it can mean to include all the angles in the clockwise direction or the counterclockwise direction, or can mean only the magnitude of the angle. In FIG. 2, the slow axis has been represented by S(+) and S(−) for convenience in explaining the range of angles formed by the slow axis in the clockwise direction or the counterclockwise direction with respect to the TD axis, but one protective film has one slow axis in the plane.

In this specification, the slow axis can mean an axis with the highest refractive index on the surface of the protective film. In this specification, the fast axis can mean an axis with the lowest refractive index on the surface of the protective film, which can be perpendicular to the slow axis.

In this specification, the longitudinal direction (MD: machine direction) can mean the traveling direction of the machine for forming a film or the length direction of the film, and the transverse direction (TD) can mean a direction perpendicular to the traveling direction of the machine or the width direction of the film. Typically, in the extruded film, the TD axis tends to have higher tensile strength than the MD axis. Therefore, it is also possible to confirm the TD axis by measuring the tensile strength of the protective film.

In one example, the protective film for preventing color distortion can have an angle formed by the slow axis with respect to the TD axis, for example, in a range of 0 to 4 degrees, 0 to 3.5 degrees, or 0 to 3 degrees. Within this angle range, it can be more advantageous to prevent color distortion upon observation of a display device with polarized sunglasses.

In one example, the protective film for preventing color distortion can have an angle of 0 to 4.5 degrees, 0 to 4 degrees, 0 to 3.5 degrees or 0 to 3 degrees as formed by the slow axis with respect to the TD axis in the clockwise direction. In another example, the protective film for preventing color distortion can have an angle of 0 to 4.5 degrees, 0 to 4 degrees, 0 to 3.5 degrees or 0 to 3 degrees as formed by the slow axis with respect to the TD axis in the counterclockwise direction.

In one example, any one protective film of the first protective film and the second protective film can be a protective film for preventing color distortion. In this case, the other protective film can be a usual protective film for polarizers. As the usual protective film for polarizers, a cellulosic film such as a TAC (triacetyl cellulose) film; a polyester film such as a PET (poly(ethylene terephthalate)) film; a polycarbonate film; a polyethersulfone film; an acrylic film and/or a polyolefin film such as a polyethylene film, a polypropylene film, a polyolefin film containing a cyclo or norbornene structure, or an ethylene-propylene copolymer film, and the like can be used, without being limited thereto. The usual protective film for polarizers can be an optically isotropic film or an optically anisotropic film. In the case of an optically anisotropic film, it can have no relationship between the TD axis and the slow axis, or can have no in-plane retardation value as described below. In another example, both the first protective film and the second protective film can be protective films for preventing color distortion. In this case, the TD axis of the first protective film and the TD axis of the second protective film can be parallel to each other.

In one example, the protective film for preventing color distortion can be a polyester film. In one example, the polyester film can be a polyethylene terephthalate film (PET film). Accordingly, it is possible to provide a polarizing plate which has excellent durability against external environment, for example, moisture due to a protective film of a polarizer, and is capable of preventing color distortion upon observation with polarized sunglasses.

As the PET film, a stretched PET film can be used. As the stretched PET film, a uniaxially stretched film with one or more layers made by forming one or more of PET-based resins to a film by melt extrusion or dissolution extrusion using a solvent and stretching it transversely, or a biaxially stretched film with one or more layers made by using longitudinal and transverse stretching after film formation, or a diagonally stretched film using diagonal stretching can be used.

The PET-based resin means a resin in which 80 mol % or more of repeating units are composed of ethylene terephthalate, which can also comprise another dicarboxylic acid component and diol component. The other dicarboxylic acid component is not particularly limited, but it can include, for example, isophthalic acid, p-βp-β-oxyethoxybenzoic acid, 4,4'-dicarboxydiphenyl, 4,4'-dicarboxybenzophenone, bis(4bis(4-carboxyphenyl)ethane, adipic acid, sebacic acid and 1,4-dicarboxycyclohexane, and the like. The other diol component is not particularly limited, but it can include propylene glycol, butanediol, neopentyl glycol, diethylene glycol, cyclohexanediol, an ethylene oxide adduct of bisphenol A, polyethylene glycol, polypropylene glycol and polytetramethylene glycol, and the like. This other dicarboxylic acid component or other diol component can be used in combination of two or more as necessary. An oxycarboxylic acid such as p-oxybenzoic acid can also be used in combination. In addition, as other copolymerization components, a dicarboxylic acid component or a diol component containing a small amount of amide bonds, urethane bonds, ether bonds and carbonate bonds or the like can also be used.

As a production method of the PET-based resin, a method of directly polycondensing terephthalic acid and ethylene glycol (and other dicarboxylic acids or other diols as required), a method of transesterification-reacting a dialkyl ester of terephthalic acid and ethylene glycol (and a dialkyl ester of other dicarboxylic acid or other diol as required), followed by polycondensation and a method of polycondensing an ethylene glycol ester (and other diol esters as required) of terephthalic acid (and other dicarboxylic acids as required), and the like can be used.

For each polymerization reaction, a polymerization catalyst containing an antimony-based, titanium-based, germanium-based or aluminum-based compound, or a polymerization catalyst containing the composite compound can be used.

The polymerization reaction conditions can be appropriately selected according to the used monomers, catalysts, reaction apparatuses and target resin properties, which are not particularly limited, but for example, the reaction temperature can be usually about 150° C. to about 300° C., about 200° C. to about 300° C. or about 260° C. to about 300° C. In addition, the reaction pressure can be usually atmospheric pressure to about 2.7 Pa, and in particular, it preferably includes a decompression in the latter half of the reaction.

The polymerization reaction can be performed by stirring reactants under such high-temperature and high-decompression conditions and volatilizing leaving reactants such as diols, alkyl compounds or water.

In addition, the polymerization apparatus can also be one in which the reaction is completed in one tank, or one in which a plurality of reaction tanks are connected. In this case, the reactants are usually polymerized while being transferred between the reaction tanks, depending on the degree of polymerization. Furthermore, a method in which a horizontal reaction apparatus is provided in the latter half of the polymerization and the reactants are volatilized while being heated and kneaded can be used.

The resin after completion of the polymerization can be obtained in the form of flakes, cooled, and pulverized in a cooling drum or a cooling belt after being discharged from the reaction tank or the horizontal reaction apparatus in a molten state, or in the form of pellets cut after being introduced into an extruder and extruded into a string shape. Furthermore, by performing solid-state polymerization, if necessary, the molecular weight can be increased or the low molecular weight component can be reduced. The low molecular weight component that can be contained in the PET-based resin can include a cyclic trimer component, but the content of such a cyclic trimer component in the resin is preferably 5000 ppm or less, and more preferably 3000 ppm or less. If the cyclic trimer component exceeds 5000 ppm, the optical properties of the film can be adversely affected.

The molecular weight of the PET-based resin can be correlated to intrinsic viscosity or limiting viscosity number, which is usually in a range of 0.45 to 1.0 dL/g, 0.50 to 1.0 dL/g or 0.52 to 0.80 dL/g, when the resin has been dissolved in a mixed solvent of phenol/tetrachloroethane=50/50 (weight ratio) and it has been represented as a limiting viscosity measured at 30° C. When the limiting viscosity number is less than 0.45 dL/g, the productivity upon film production can be lowered or the mechanical strength of the film can be lowered. In addition, when the limiting viscosity number exceeds 1.0 dL/g, the melt extrusion stability of the polymer in the production of a film can be poor.

In addition, the PET-based resin can contain additives as required. The additive can include a lubricant, an anti-blocking agent, a heat stabilizer, an antioxidant, an antistatic agent, a light stabilizer and an impact resistance improver, and the like. The addition amount thereof is preferably within a range that does not adversely affect the optical properties.

The PET-based resin can be used in the form of pellets assembled by an ordinary extruder, for formulation of such additives or film molding to be described below. The size and shape of the pellets are not particularly limited, but they can be generally a cylindrical, spherical or flat spherical shape having both height and diameter of 5 mm or less. The PET-based resin thus obtained can be molded into a film form and subjected to a stretching treatment to obtain a transparent and homogeneous PET film having high mechanical strength. The production method thereof is not particularly limited, and for example, the following method can be applied.

First, pellets made of the dried PET resin are supplied to a melt extrusion apparatus, heated to a melting point or higher and melted. Next, the melted resin can be extruded from the die and quenched and solidified on a rotary cooling drum to a temperature below the glass transition temperature to obtain an un-stretched film in a substantially amorphous state. This melting temperature is determined according to the melting point of the PET-based resin to be used or the extruder, which is not particularly limited, but it can be usually 250 to 350° C. In order to improve planarity of the film, it is also preferred to enhance adhesion between the film and the rotary cooling drum, where an adhesion method by electrostatic application or an adhesion method by liquid coating can be used. The adhesion method by electrostatic application is usually a method in which linear electrodes are provided on the upper surface side of a film in a direction perpendicular to the flow of the film and a direct current voltage of about 5 to 10 kV is applied to the electrodes to provide static charges to the film, thereby improving the adhesion between the rotary cooling drum and the film. In addition, the adhesion method by liquid coating is a method for improving the adhesion between the rotary cooling drum and the film by uniformly coating a liquid to all or a part (for example, only the portion in contact with both film ends) of the surface of the rotary cooling drum. Both of these methods can also be used in combination if necessary. The PET-based resin to be used can be mixed with two or more resins, or resins having different structures or compositions, if necessary. For example, it can include using a mixture of pellets blended with a particulate filling material as an anti-blocking agent, an ultraviolet absorbing agent or an antistatic agent, and the like, and non-blended pellets, and the like.

Furthermore, the laminating number of films to be extruded can also be two or more layers, if necessary. For example, it can include pellets blended with a particulate filling material as an anti-blocking agent and non-blended pellets are prepared and supplied from the other extruder to the same die to extrude a film composed of two kinds and three layers, "blended with filling material/no-blended/blended with filling material," and the like.

The un-stretched film is usually stretched at a temperature not lower than the glass transition temperature in the extrusion direction first. The stretching temperature can be usually 70 to 150° C., 80 to 130° C., or 90 to 120° C. In addition, the stretching ratio can be usually 1.1 to 6 times or 2 to 5.5 times. If the stretching ratio is less than 1.1 times, the mechanical strength of the stretched PET film can be insufficient. If the stretching ratio exceeds 6 times, the strength in the transverse direction can be insufficient for actual use. This stretching can also be completed once, or can also be divided into a plurality of times as necessary. Generally, even in the case of performing the plurality of times of stretching, the total stretching ratio is preferably in the above range.

The longitudinally stretched film thus obtained can be subjected to a heat treatment thereafter. Then, a relaxation treatment can be performed if necessary. The heat treatment temperature can be usually 150 to 250° C., 180 to 245° C. or 200 to 230° C. Also, the heat treatment time can be usually 1 to 600 seconds or 1 to 300 seconds or 1 to 60 seconds. The temperature of the relaxation treatment can be usually 90 to 200° C. or 120 to 180° C. Also, the amount of relaxation can be usually 0.1 to 20% or 2 to 5%. The relaxation treatment temperature and the relaxation amount is preferably set so that a heat shrinkage rate of the PET film after relaxation treatment at 150° C. is 2% or less.

In the case of obtaining uniaxially stretched and biaxially stretched films, transverse stretching can be usually performed by tenters after the longitudinal stretching treatment or after the heat treatment or relaxation treatment, if necessary. The stretching temperature can be usually 70 to 150° C., 80 to 130° C., or 90 to 120° C. In addition, the stretching ratio can be usually 1.1 to 6 times or 2 to 5.5 times. If the stretching ratio in the transverse stretching is less than 1.1 times, improvement in the film strength due to orientation can be insufficient. In addition, the stretching ratio exceeding 6 times is not realistic in the manufacturing technique.

Thereafter, the heat treatment and, if necessary, the relaxation treatment can be performed. The heat treatment temperature can be usually 150 to 250° C. or 180 to 245° C. or 200 to 230° C. The heat treatment time can be usually 1 to 600 seconds, 1 to 300 seconds, or 1 to 60 seconds. The temperature of the relaxation treatment can be usually 100 to 230° C., 110 to 210° C. or 120 to 180° C. Also, the relaxation amount can be usually 0.1 to 20%, 1 to 10%, or 2 to 5%. The relaxation treatment temperature and the relaxation amount is preferable set so that the heat shrinkage rate of the PET film after the relaxation treatment at 150° C. is 2% or less.

In the uniaxial stretching and biaxial stretching treatments, when the stretching treatment temperature exceeds 250° C., thermal deterioration occurs in the resin or crystallization progresses excessively, whereby the optical performance can be lowered. In addition, when the stretching treatment temperature is lower than 70° C., excessive stress can be applied to the stretching, or the film can become solidified and the stretching itself can become impossible.

Furthermore, in the uniaxial stretching and biaxial stretching treatments, in order to alleviate deformation of the orientation main axis as represented by bowing, the heat treatment can be performed again or the stretching treatment can be performed after the transverse stretching. The maximum value of deformation in the orientation main axis by bowing with respect to the stretching direction is usually within 45°, but it is preferably relaxed within 30° and more preferably within 15°. If the maximum value of deformation in the orientation main axis is more than 45°, when the polarizing plate has been configured and formed into a single sheet in the subsequent processes, there can be unevenness in optical characteristics among the single sheets. Here, the stretching direction refers to a stretching large direction in longitudinal stretching or transverse stretching.

In the biaxial stretching of the PET film, since the transverse stretching ratio is usually made slightly larger than the longitudinal stretching ratio, in this case, the stretching direction can mean a direction perpendicular to the longitudinal direction of the film. Furthermore, in the uniaxial stretching, usually, since the stretching is performed in the transverse direction as described above, in this case, the stretching direction equally refers to a direction perpendicular to the longitudinal direction.

Also, here, the orientation main axis refers to a molecular orientation direction at any point on the stretched PET film. Furthermore, the deformation of the orientation main axis with respect to the stretching direction refers to an angle difference between the orientation main axis and the stretching direction. In addition, the maximum value thereof refers to a maximum value of the values on the vertical direction with respect to the long direction.

The orientation main axis can be measured using, for example, a retardation film/optical material inspection apparatus RETS (manufactured by Otsuka Densi KK) or a molecular orientation system MOA (manufactured by Oji Scientific Instruments).

When the stretched PET film is used on the viewing side of the polarizing plate, the film can be imparted with antiglare properties (haze). The method of imparting antiglare properties is not particularly limited, and for example, a method of mixing inorganic particulates or organic particulates into the raw resin to form a film, a method of forming a stretched film from an un-stretched film having a layer, in which inorganic particulates or organic particulates are mixed, on one side, based on the method of producing the multilayered film, or a method of coating a coating liquid formed by mixing inorganic particulates or organic particulates with a curable binder resin on one side of a stretched PET film and curing the binder resin to form an antiglare layer, and the like can be used.

The inorganic particulates for imparting antiglare properties are not particularly limited, but can include, for example, silica, colloidal silica, alumina, alumina sol, an aluminosilicate, an alumina-silica composite oxide, kaolin, talc, mica, calcium carbonate, and the like. Also, the organic particulates are not particularly limited, but can include, for example, crosslinked polyacrylic acid particles, methyl methacrylate/styrene copolymer resin particles, crosslinked polystyrene particles, crosslinked polymethyl methacrylate particles, silicone resin particles and polyimide particles, and the like.

A functional layer such as a conductive layer, a hard coating layer and a low reflective layer can be further laminated on the antiglare property-imparted stretched PET film. Furthermore, as the resin composition constituting the antiglare layer, a resin composition having any one of these functions can also be selected.

On the other hand, when the stretched PET film is used on the backlight side of the polarizing plate, the film can also be imparted with no antiglare property. In this case, the haze value can typically be less than 6%. However, the functional layer can be laminated without imparting the antiglare property.

The haze value can be measured in accordance with HS K 7136, for example, using a haze-permeability meter HM-150 (manufactured by Murakami Color Research Laboratory, Co., Ltd.).

In the stretched PET film, functional layers other than the antiglare layer and the like can be laminated on one side or both sides, as long as the effect of the present invention is not hindered. The functional layer to be laminated can include, for example, a conductive layer, a hard coating layer, a smoothing layer, an easily slipping layer, an anti-blocking layer, and an easy adhesion layer, and the like. Among them, the stretched PET film can be laminated through the polarizing film and the adhesive layer, and therefore it is preferable that the easy adhesion layer is laminated.

The component constituting the easy adhesion layer is not particularly limited, but it can include, for example, a polyester-based resin, a urethane-based resin or an acrylic resin, and the like, having a polar group in its skeleton, a relatively low molecular weight and a low glass transition temperature. Furthermore, if necessary, it can contain a crosslinking agent, an organic or inorganic filler, a surfactant, a lubricant, and the like.

The method of forming the functional layer on the stretched PET film is not particularly limited, but for example, a method of forming it on the film in which all the stretching processes are completed, a method of forming it in processes of stretching the PET-based resin, for example, between longitudinal stretching and transverse stretching processes, a method of forming it immediately before or after the film is adhered to the polarizer, and the like can be used. Among them, from the viewpoint of productivity, a method in which it is formed after longitudinal stretching of the PET-based resin and continuously subjected to transverse stretching can be preferably used.

The stretched PET film thus obtained can easily obtain commercially available products, which can include, as trade names, "DIAFOIL," "HOSTAPHAN," "FUSION" (manufactured by Mitsubishi Plastics, Inc.), "Teijin Tetoron Film," "Melinex," "Mylar," "Teflex" (manufactured by Teijin DuPont Film Co., Ltd.), "Toyobo Ester Film," "Toyobo ESPET Film," "COSMOSHINE," "Crisper" (manufactured by Toyobo Co., Ltd.), "Lumirror" (manufactured by Toray Film Co., Ltd.), "EMBLON," "EMBLET" (manufactured by UNITAKA LTD), "SKYROL" (manufactured by SKC, Inc), "KOFIL" (manufactured by KOHAP Corporation), "Seotong Polyester Film" (manufactured by Seotong Co., Ltd.) and "TaiKou Polyester Film" (manufactured by Futamura Chemical Co., Ltd.), and the like. Of these, biaxially stretched products can be used in view of productivity and low cost.

In order to satisfy the relationship between the TD axis and the slow axis of the protective film for preventing color distortion, a method of adjusting the TD axis and the slow axis of the film, which is known in the art, can be applied.

As one example, in a method of adjusting the angle formed by the TD axis and the slow axis, the principal acting factor can be the accuracy of the TD stretching. Among the processes of manufacturing a protective film, in the TD stretching process, the stretching is performed by holding a film by tenters and stretching it with the applied tension in the TD direction (outside of the film), where the angle formed by the TD axis and the slow axis can be adjusted to be close to 0 degrees depending on how well the positional accuracy on which both tenters act and the tension on both sides coincide.

As another example, an annealing process can be performed to solve the stress of high tension after TD stretching. At this time, the adjustment of the angle formed by the TD axis and the slow axis can be performed by adjusting the heat supply amount in the annealing process. For example, when the heat supply amount is reduced, the angle formed by the slow axis with respect to the TD axis can be maintained close to 0 degrees. This is because when the heat supply is increased in the annealing process, which is a process after the film stretching process, the angle of the slow axis in the TD axis direction can deviate much from 0 degrees due to the softening action of the film.

The protective film for preventing color distortion can be a retardation film having an in-plane retardation value. In one example, the protective film for preventing color distortion can have an in-plane retardation value (Rin) of 10 nm to 7500 nm for light having a wavelength of 550 nm. In this specification, the in-plane retardation value (Rin) can be calculated by the following Equation 1. Specifically, the in-plane retardation value can be 10 nm or more, 50 nm or more, 100 nm or more, 200 nm or more, 300 nm or more, 400 nm or more, 500 nm or more, 600 nm or more, 700 nm or more, 800 nm or more, or 900 nm or more, and can be 7500 nm or less, 7000 nm or less, 6500 nm or less, 6000 nm or less, 5500 nm or less, 5000 nm or less, 4500 nm or less, 4000 nm or less, 3500 nm or less, 3000 nm or less, 2500 nm or less, 2000 nm or less, 1500 nm or less, 1000 nm or less, 750 nm or less, 500 nm or less, or 350 nm or less. According to one example of the present application, the in-plane retardation value can be in a range of 10 nm to 1000 nm. Within this range of in-plane retardation values, it is possible to effectively prevent color distortion upon observation of a display device with polarized sunglasses.

$$Rin = (nx - ny) \times d \quad \text{[Equation 1]}$$

In Equation 1, nx and ny are refractive indexes of the protective film for preventing color distortion in the x-axis and y-axis directions for light having a wavelength of 550 nm, respectively, and d is the thickness of the protective film for preventing color distortion. The x-axis and y-axis denote the slow axis and the fast axis of the protective film, respectively.

In one example, the thickness of the protective film for preventing color distortion can be 35 μm to 85 μm. When any one of the first and second protective films is a protective film for preventing color distortion, the other protective film can satisfy the thickness range. Within the thickness range, it can be advantageous to effectively prevent color distortion upon observation of a display device with polarized sunglasses.

In one example, the TD axis of the protective film for preventing color distortion can form an angle of 80.5 degrees to 99.5 degrees with the light absorption axis of the polarizer. Through this axial relationship, it is possible to effectively prevent color distortion upon observation of a display device with polarized sunglasses.

In one example, the first protective film and the second protective film can each be attached to the polarizer via an adhesive layer. As the adhesive layer, a known adhesive layer that can be used for attaching the polarizer and the protective film in the related art can be used, and for example, an adhesive such as acryl series, silicone series or epoxy series can be used. As the adhesive layer, a photo curing or thermal curing adhesive layer can be used, and as the photo curing adhesive layer, for example, a UV (ultraviolet) curing adhesive layer can be used.

The present application also relates to a display device. FIG. 3 exemplarily shows the display device of the present application. As shown in FIG. 3, the display device can comprise a display panel (30), a first polarizing plate (10) disposed on the viewing side of the display panel and a second polarizing plate (20) disposed on the opposite side of the viewing side of the display panel. The first polarizing plate (10) can comprise a first protective film (102), a first polarizer (101) and a second protective film (103) sequentially. The second polarizing plate (20) can comprise a third protective film (202), a second polarizer (201) and a fourth protective film (203) sequentially. For the details of the first and second polarizers, the details described in the item of the polarizing plate can be applied equally.

One or more protective films of the first to fourth protective films can be a protective film for preventing color distortion, in which the angle of the protective film formed by the slow axis with respect to the TD axis is within the range of 0 to 4.5 degrees. Through this, it is possible to prevent color distortion upon observation with polarized sunglasses. For the details of the protective film for preventing color distortion, the details described in the item of the polarizing plate can be applied equally. For the protective films other than the protective film for preventing color distortion of the first to fourth protective films, the details for the conventional protective film of the polarizer described in the item of the polarizing plate can be applied equally.

As one example, at least two protective films of the first to fourth protective films can be protective films for preventing color distortion. Hereinafter, for convenience of explanation, the two protective films in the at least two protective films can be referred to as a first protective film for preventing color distortion and a second protective film for preventing color distortion, respectively.

FIGS. 4 and 5 exemplarily show the relationships between the TD axes and the slow axes of the first and second protective films for preventing color distortion, respectively. In the first protective film for preventing color distortion of FIG. 4, the angle $a_1(+)$ means an angle formed by the slow axis ($S_1(+)$) in the clockwise direction with respect to the TD axis ($TD_1$), and the angle $a_1(-)$ means an angle formed by the slow axis ($S_1(-)$) in the counterclockwise direction with respect to the TD axis ($TD_1$). In the second protective film for preventing color distortion of FIG. 5, the angle $a_2(+)$ means an angle formed by the slow axis ($S_2(+)$) in the clockwise direction with respect to the TD axis ($TD_2$), and the angle $a_2(-)$ means an angle formed by the slow axis ($S_2(-)$) in the counterclockwise direction with respect to the TD axis ($TD_2$).

As one example, in the at least two protective films for preventing color distortion, the difference in absolute values of the angles formed by the slow axes of the respective protective films with respect to the TD axes can be 3.5 degrees or less.

As a specific example, the difference ($|a_1 - a_2|$) in the absolute values of the angle ($a_1$) formed by the slow axis of the first protective film for preventing color distortion with respect to the TD axis and the angle ($a_2$) formed by the slow axis of the second protective film for preventing color distortion with respect to the TD axis can be 3.5 degrees or less. The difference in the absolute values of the angles can be 3 degrees or less, 2 degrees or less, 1 degree or less, or 0.5 degrees or less, or the magnitudes of the angles $a_1$ and $a_2$ can be equal to each other. Through this relationship between the TD axis and the slow axis, it is possible to effectively prevent color distortion upon observation of a display device with polarized sunglasses.

As one example, in the at least two protective films for preventing color distortion, the angles formed by the slow axes of the respective protective films with respect to the TD axes can be each independently within a range of 0 to 4.5 degrees in the clockwise direction or 0 to 4.5 degrees in the counterclockwise direction.

As a specific example, the angle ($a_1$) formed by the slow axis of the first protective film for preventing color distortion with respect to the TD axis and the angle ($a_2$) formed by the slow axis of the second protective film for preventing color distortion with respect to the TD axis can be each independently within a range of 0 degrees to 4.5 degrees, 0 degrees to 4 degrees, 0 degrees to 3.5 degrees, or 0 degrees to 3 degrees in the clockwise direction.

As a specific example, the angle ($a_1$) formed by the slow axis of the first protective film for preventing color distortion with respect to the TD axis and the angle ($a_2$) formed by the slow axis of the second protective film for preventing color distortion with respect to the TD axis can be each independently within a range of 0 degrees to 4.5 degrees, 0 degrees to 4 degrees, 0 degrees to 3.5 degrees, or 0 degrees to 3 degrees in the counterclockwise direction.

As a specific example, the angle ($a_1$) formed by the slow axis of the first protective film for preventing color distortion with respect to the TD axis can be within the range of 0 degrees to 4.5 degrees, 0 degrees to 4 degrees, 0 degrees to 3.5 degrees, or 0 degrees to 3 degrees in the clockwise direction, and the angle ($a_2$) formed by the slow axis of the second protective film for preventing color distortion with respect to the TD axis can be within the range of 0 degrees to 4.5 degrees, 0 degrees to 4 degrees, 0 degrees to 3.5 degrees, or 0 degrees to 3 degrees in the counterclockwise direction.

As a specific example, the angle ($a_1$) formed by the slow axis of the first protective film for preventing color distortion with respect to the TD axis can be within the range of 0 degrees to 4.5 degrees, 0 degrees to 4 degrees, 0 degrees to 3.5 degrees, or 0 degrees to 3 degrees in the counterclockwise direction, and the angle ($a_2$) formed by the slow axis of the second protective film for preventing color distortion with respect to the TD axis can be within the range of 0 degrees to 4.5 degrees, 0 degrees to 4 degrees, 0 degrees to 3.5 degrees, or 0 degrees to 3 degrees in the clockwise direction.

As one example, in the at least two protective films for preventing color distortion, the TD axes of the respective protective films can be orthogonal to each other. As a specific example, the TD axis ($TD_1$) of the first protective film for preventing color distortion and the TD axis ($TD_2$) of the second protective film for preventing color distortion can be orthogonal to each other. Through this arrangement, it is possible to effectively prevent color distortion upon observation of a display device with polarized sunglasses.

As one example, any one protective film of the first protective film and the second protective film, and any one protective film of the third protective film and the fourth protective film can be protective films for preventing color distortion, respectively. As a specific example, the first protective film and the fourth protective film can be the protective films for preventing color distortion, respectively. Through this arrangement, it is possible to effectively prevent color distortion upon observation of a display device with polarized sunglasses.

FIG. 6 exemplarily shows a structure of polarized sunglasses and a display device. As shown in FIG. 6, the polarized sunglasses (40) can comprise a left eye lens (401) and a right eye lens (402), where the right eye lens and the left eye lens can each comprise a polarizer. In one example, the light absorption axes of the polarizers of the right eye lens and the left eye lens can be parallel to each other. The light absorption axis of the polarizer included in the first polarizing plate of the display device and the light absorption axis of the polarizer included in the polarized sunglasses can be parallel to each other in terms of brightness enhancement.

The first polarizing plate can further comprise a ¼ wavelength plate on the viewing side, if necessary. In one example, the slow axis of the ¼ wavelength plate and the light absorption axis of the polarizing plate can form 40 degrees to 50 degrees, 43 degrees to 47 degrees, and preferably 45 degrees from each other. When the display device is observed with the polarized sunglasses, the brightness of the screen observed by the observer is lowered in accordance with the relationship between the light absorption axis of the polarizer included in the polarizing plate of the display device and the light absorption axis of the polarizer included in the polarized sunglasses, or in some cases, the screen may not be observed. When the polarizing plate of the display device further comprises the ¼ wavelength plate, it can be advantageous in terms of preventing brightness decrease depending on the relationship of the light absorption axes.

In one example, the display panel can be a liquid crystal panel. The liquid crystal panel can comprise a liquid crystal layer disposed between a first substrate and a second substrate which are disposed opposite to each other. The liquid crystal layer can comprise liquid crystal molecules. The kind and physical properties of the liquid crystal molecules, and the like can be appropriately selected according to the desired driving mode of the liquid crystal panel. As the liquid crystal molecules, for example, liquid crystal molecules capable of exhibiting a nematic phase, a smectic phase or a cholesteric phase can be used.

The driving mode of the liquid crystal panel can be exemplified by a DS (Dynamic Scattering) mode, an ECB (Electrically Controllable Birefringence) mode, an IPS (In-Plane Switching) mode, an FFS (Fringe-Field Switching) mode, an OCB (Optically Compensated Bend) mode, a VA (Vertical Alignment) mode, an MVA (Multi-domain Vertical Alignment) mode, a PVA (Patterned Vertical Alignment) mode, an HAN (Hybrid Aligned Nematic) mode, a TN (Twisted Nematic) mode or an STN (Super Twisted Nematic) mode, and the like, but is not limited thereto.

First and second electrode layers can be formed on the inner sides of the first substrate and the second substrate, respectively. The electrode layer can apply an electric field to the liquid crystal layer so that the alignment state of the liquid crystal layer can be switched. As the electrode layer, a transparent electrode layer can be used. As the transparent electrode layer, for example, one formed by depositing a conductive polymer, a conductive metal, a conductive nanowire or a metal oxide such as ITO (indium tin oxide), and the like can be used. Besides, various materials capable of forming the transparent electrode and forming methods are known, which can be applied without limitation. If necessary, the electrode layer can also be appropriately patterned.

First and second alignment films for orientation of the liquid crystal layer can be formed on the inner sides of the first and second electrode layers. As the alignment film, a vertical alignment film, a horizontal alignment film or a diagonal alignment film can be used. As the alignment film, a contact type alignment film such as a rubbing alignment film, or a photo alignment film, which comprises a photo alignment film compound and is capable of exhibiting orientation characteristics by a non-contact method such as irradiation of linearly polarized light, can be used.

As the first substrate and the second substrate, for example, an inorganic film such as a glass substrate, a crystalline or amorphous silicon film, quartz or an ITO (indium tin oxide) film, or a plastic film, and the like can be used. As the substrate, an optically isotropic base material or an optically anisotropic base material such as a retardation layer can be used. A specific example of the plastic film base material can be exemplified by a base film including TAC (triacetyl cellulose); a COP (cycloolefin copolymer) such as a norbornene derivative; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (poly ether sulfone); PEEK (polyetheretherketone); PPS (polyphenylsulfone), PEI (polyetherimide); PEN (polyethylenenaphthalate); PET (polyethyleneterephthalate); PI (polyimide); PSF (polysulfone); PAR (polyarylate) or an amorphous fluororesin, and the like, but is not limited thereto. A coating layer of gold, silver, or a silicon compound such as silicon dioxide or silicon monoxide, or a coating layer such as an antireflection layer can also be present on the base material.

The display device can further comprise a light source on the side opposite to the viewing side of the liquid crystal panel, where the second polarizing plate can be disposed between the light source and the liquid crystal panel. As the light source, a conventional backlight unit can be used, where the backlight unit can be distinguished by an edge method and a direct-down method according to the manner in which the light-emitting lamp is disposed.

The display device (liquid crystal display device) comprising the liquid crystal panel can be, for example, a transmissive liquid crystal display device, a semi-transmissive liquid crystal display device, a reflective liquid crystal display device, a direct viewing type liquid crystal display device, or a projection type liquid crystal display device. Furthermore, the liquid crystal display device can be a display device for displaying two-dimensional images or a stereoscopic image display device for displaying three-dimensional images.

Here, the liquid crystal display device has been described as an example of the application of the polarizing plate of the present application, but the application of the polarizing plate of the present application is not limited to the device, and it can be applied to various display devices to which a polarizing plate can be applied to a display device. An example of other display devices includes an inorganic light emitting display, a field emission display (FED), a surface field emission display (SPED), a display using an electronic paper (electronic ink or electrophoretic element), a plasma display, a projection display (for example, a grating light valve (GLV) display), a display having a digital micromirror device (digital light processing) and a piezoelectric ceramic display, and the like. In addition, the manner of constituting the display device is not particularly limited and can be variously modified in a manner known in the art as long as the polarizing plate of the present application is included in the display device.

Advantageous Effects

The present application can provide a polarizing plate which has excellent durability against external environment, for example, moisture due to a protective film of a polarizer, and is capable of preventing color distortion upon observation with polarized sunglasses, and a display device comprising the polarizing plate.

BRIEF DESCRIPTION OF DRAWINGS

FIG. 1 exemplarily shows the polarizing plate of the present application. FIG. 2 exemplarily shows the slow axis relationship of the protective film for preventing color distortion with respect to the TD axis.

FIG. 3 exemplarily shows the display device of the present application.

FIG. 4 exemplarily shows the slow axis relationship of the first protective film for preventing color distortion with respect to the TD axis.

FIG. 5 exemplarily shows the slow axis relationship of the second protective film for preventing color distortion with respect to the TD axis.

FIG. 6 exemplarily shows a structure of observing a display device with polarized sunglasses.

EXAMPLES

Hereinafter, the above contents will be described in more detail by way of Examples and Comparative Examples, but the scope of the present application is not limited to the following contents.

Example 1

As a first protective film, a PET film having an in-plane retardation value of 315 nm for light with a wavelength of 550 nm and having the slow axis at an angle of 1 degree in the clockwise direction with respect to the TD axis (on the basis of 0 degrees) was prepared. As second and third protective films, TAC films each having an angle of 0 degrees as formed by the slow axis with respect to the TD axis were prepared. As a fourth protective film, a PET film having an in-plane retardation value of 315 nm for light with a wavelength of 550 nm and having the slow axis at an angle of 1 degree in the counterclockwise direction with respect to the TD axis (on the basis of 0 degrees) was prepared. As first and second polarizers, PVA-based polarizers each having a polarization property of 99.995%, were prepared.

The first and second protective films were attached to both sides of the first polarizer, respectively, to produce a first polarizing plate. In addition, the third and fourth protective films were attached to both sides of the second polarizer, respectively, to produce a second polarizing plate. The attachment of the polarizer and the protective film was performed by a UV curing method. At this time, the first protective film and the first polarizer were attached so that the TD axis of the first protective film and the light absorption axis of the first polarizer formed 90 degrees with each other, and the fourth protective film and the second polarizer were attached so that the TD axis of the fourth protective film and the light absorption axis of the second polarizer formed 90 degrees with each other.

Example 2

First and second polarizing plates were produced in the same manner as in Example 1, except that the slow axis of the first protective film formed 3 degrees in the clockwise direction with respect to the TD axis and the slow axis of the fourth protective film formed 3 degrees in the counterclockwise direction with respect to the TD axis.

Example 3

First and second polarizing plates were produced in the same manner as in Example 1, except that the slow axis of the first protective film formed 3 degrees in the clockwise direction with respect to the TD axis and the slow axis of the fourth protective film formed 3 degrees in the clockwise direction with respect to the TD axis.

Example 4

First and second polarizing plates were produced in the same manner as in Example 1, except that the slow axis of the first protective film formed 3 degrees in the counterclockwise direction with respect to the TD axis and the slow axis of the fourth protective film formed 3 degrees in the counterclockwise direction with respect to the TD axis.

Comparative Example 1

First and second polarizing plates were produced in the same manner as in Example 1, except that the slow axis of the first protective film formed 4.6 degrees in the clockwise direction with respect to the TD axis and the slow axis of the fourth protective film formed 4.6 degrees in the counterclockwise direction with respect to the TD axis.

Comparative Example 2

First and second polarizing plates were produced in the same manner as in Example 1, except that the slow axis of the first protective film formed 4.6 degrees in the clockwise direction with respect to the TD axis and the slow axis of the fourth protective film formed 4.6 degrees in the clockwise direction with respect to the TD axis.

Comparative Example 3

First and second polarizing plates were produced in the same manner as in Example 1, except that the slow axis of the first protective film formed 4.6 degrees in the counterclockwise direction with respect to the TD axis and the slow axis of the fourth protective film formed 4.6 degrees in the counterclockwise direction with respect to the TD axis.

Comparative Example 4

First and second polarizing plates were produced in the same manner as in Example 1, except that the slow axis of the first protective film formed 6 degrees in the clockwise direction with respect to the TD axis and the slow axis of the fourth protective film formed 6 degrees in the counterclockwise direction with respect to the TD axis.

Comparative Example 5

First and second polarizing plates were produced in the same manner as in Example 1, except that the slow axis of the first protective film formed 6 degrees in the clockwise direction with respect to the TD axis and the slow axis of the fourth protective film formed 6 degrees in the clockwise direction with respect to the TD axis.

Comparative Example 6

First and second polarizing plates were produced in the same manner as in Example 1, except that the slow axis of the first protective film formed 6 degrees in the counterclockwise direction with respect to the TD axis and the slow axis of the fourth protective film formed 6 degrees in the counterclockwise direction with respect to the TD axis.

Comparative Example 7

First and second polarizing plates were produced in the same manner as in Example 1, except that the slow axis of the first protective film formed 12 degrees in the clockwise direction with respect to the TD axis and the slow axis of the fourth protective film formed 12 degrees in the counterclockwise direction with respect to the TD axis.

Comparative Example 8

First and second polarizing plates were produced in the same manner as in Example 1, except that the slow axis of the first protective film formed 12 degrees in the clockwise direction with respect to the TD axis and the slow axis of the fourth protective film formed 12 degrees in the clockwise direction with respect to the TD axis.

Comparative Example 9

First and second polarizing plates were produced in the same manner as in Example 1, except that the slow axis of the first protective film formed 12 degrees in the counterclockwise direction with respect to the TD axis and the slow axis of the fourth protective film formed 12 degrees in the counterclockwise direction with respect to the TD axis.

Comparative Example 10

First and second polarizing plates were produced in the same manner as in Example 1, except that the slow axis of the first protective film formed 17 degrees in the clockwise direction with respect to the TD axis and the slow axis of the fourth protective film formed 17 degrees in the counterclockwise direction with respect to the TD axis.

Comparative Example 11

First and second polarizing plates were produced in the same manner as in Example 1, except that the slow axis of the first protective film formed 17 degrees in the clockwise direction with respect to the TD axis and the slow axis of the fourth protective film formed 17 degrees in the clockwise direction with respect to the TD axis.

Comparative Example 12

First and second polarizing plates were produced in the same manner as in Example 1, except that the slow axis of the first protective film formed 17 degrees in the counterclockwise direction with respect to the TD axis and the slow axis of the fourth protective film formed 17 degrees in the counterclockwise direction with respect to the TD axis.

Comparative Example 13

First and second polarizing plates were produced in the same manner as in Example 1, except that the slow axis of the first protective film formed 27 degrees in the clockwise direction with respect to the TD axis and the slow axis of the fourth protective film formed 27 degrees in the counterclockwise direction with respect to the TD axis.

Comparative Example 14

First and second polarizing plates were produced in the same manner as in Example 1, except that the slow axis of the first protective film formed 27 degrees in the clockwise direction with respect to the TD axis and the slow axis of the fourth protective film formed 27 degrees in the clockwise direction with respect to the TD axis.

Comparative Example 15

First and second polarizing plates were produced in the same manner as in Example 1, except that the slow axis of the first protective film formed 27 degrees in the counterclockwise direction with respect to the TD axis and the slow axis of the fourth protective film formed 27 degrees in the counterclockwise direction with respect to the TD axis.

Comparative Example 16

First and second polarizing plates were produced in the same manner as in Example 1, except that the slow axis of the first protective film formed 40.6 degrees in the clockwise direction with respect to the TD axis and the slow axis of the fourth protective film formed 40.6 degrees in the counterclockwise direction with respect to the TD axis.

Comparative Example 17

First and second polarizing plates were produced in the same manner as in Example 1, except that the slow axis of the first protective film formed 40.6 degrees in the clockwise direction with respect to the TD axis and the slow axis of the fourth protective film formed 40.6 degrees in the clockwise direction with respect to the TD axis.

Comparative Example 18

First and second polarizing plates were produced in the same manner as in Example 1, except that the slow axis of the first protective film formed 40.6 degrees in the counterclockwise direction with respect to the TD axis and the slow axis of the fourth protective film formed 40.6 degrees in the counterclockwise direction with respect to the TD axis.

Examples 5 to 8 and Comparative Examples 19 to 36

First and second polarizing plates were produced in the same manner as in Examples 1 to 4 and Comparative Examples 1 to 18, except that in each of Examples 1 to 4 and Comparative Examples 1 to 18, the in-plane retardation values of the first protective film and the second protective film for light with a wavelength of 550 nm were changed to 720 nm.

Examples 9 to 12 and Comparative Examples 37 to 54

First and second polarizing plates were produced in the same manner as in Examples 1 to 4 and Comparative Examples 1 to 18, except that in each of Examples 1 to 4 and Comparative Examples 1 to 18, the in-plane retardation values of the first protective film and the second protective film for light with a wavelength of 550 nm were changed to 954 nm.

Reference Example 1

First and second polarizing plates were produced in the same manner as in Example 1, except that the TAC protective film having an angle of 0 degrees as formed by the slow axis with respect to the TD axis was used as each of first, second, third and fourth protective films.

Evaluation Example 1. Visual Sensation Evaluation

The first polarizing plates and the second polarizing plates produced in Examples 1 to 12, Comparative Examples 1 to 54 and Reference Example 1 were each attached to both sides of a liquid crystal display panel (product from AUO) to prepare a display device. At this time, the plates were attached so that the TD axis of the first protective film and the TD axis of the fourth protective film were orthogonal to each other, the second and third protective films were disposed close to the liquid crystal display panel side, and the first and fourth protective films were disposed outside the display device.

The visual sensation was evaluated while observing the display device in a state without polarized sunglasses and in a state with polarized sunglasses (product from Luxen), and the results were described in Tables 1 to 3 below. The evaluation results were classified into "no color distortion," "color distortion occurred" and "strong color distortion (rainbow phenomenon observed)." The occurrence of color distortion was classified by the color difference with the display device produced by attaching the first polarizing plate and the second polarizing plate of Reference Example 1 to both sides of the liquid crystal display panel.

TABLE 1

| | | In-plane retardation (nm) | Angle of slow axis with respect to TD axis (°) | | Visual sensation without sunglasses | Visual sensation with sunglasses |
|---|---|---|---|---|---|---|
| | | | First protective film | Fourth protective film | | |
| Example | 1 | 315 | +1.0 | −1.0 | No color distortion | No color distortion |
| | 2 | 315 | +3.0 | −3.0 | No color distortion | No color distortion |
| | 3 | 315 | +3.0 | +3.0 | No color distortion | No color distortion |
| | 4 | 315 | −3.0 | −3.0 | No color distortion | No color distortion |
| Comparative Example | 1 | 315 | +4.6 | −4.6 | No color distortion | Color distortion occurred |
| | 2 | 315 | +4.6 | +4.6 | No color distortion | Color distortion occurred |
| | 3 | 315 | −4.6 | −4.6 | No color distortion | Color distortion occurred |
| | 4 | 315 | +6.0 | −6.0 | No color distortion | Color distortion occurred |

TABLE 1-continued

|  | In-plane retardation (nm) | Angle of slow axis with respect to TD axis (°) | | Visual sensation without sunglasses | Visual sensation with sunglasses |
|---|---|---|---|---|---|
|  |  | First protective film | Fourth protective film |  |  |
| 5 | 315 | +6.0 | +6.0 | No color distortion | Color distortion occurred |
| 6 | 315 | −6.0 | −6.0 | No color distortion | Color distortion occurred |
| 7 | 315 | +12.0 | −12.0 | No color distortion | Strong color distortion |
| 8 | 315 | +12.0 | +12.0 | No color distortion | Strong color distortion |
| 9 | 315 | −12.0 | −12.0 | No color distortion | Strong color distortion |
| 10 | 315 | +17.0 | −17.0 | No color distortion | Strong color distortion |
| 11 | 315 | +17.0 | +17.0 | No color distortion | Strong color distortion |
| 12 | 315 | −17.0 | −17.0 | No color distortion | Strong color distortion |
| 13 | 315 | +27.0 | −27.0 | No color distortion | Strong color distortion |
| 14 | 315 | +27.0 | +27.0 | No color distortion | Strong color distortion |
| 15 | 315 | −27.0 | −27.0 | No color distortion | Strong color distortion |
| 16 | 315 | +40.6 | −40.6 | No color distortion | Strong color distortion |
| 17 | 315 | +40.6 | +40.6 | No color distortion | Strong color distortion |
| 18 | 315 | −40.6 | −40.6 | No color distortion | Strong color distortion |

TABLE 2

|  |  | In-plane retardation (nm) | Angle of slow axis with respect to TD axis (°) | | Visual sensation without sunglasses | Visual sensation with sunglasses |
|---|---|---|---|---|---|---|
|  |  |  | First protective film | Fourth protective film |  |  |
| Example | 5 | 720 | +1.0 | −1.0 | No color distortion | No color distortion |
|  | 6 | 720 | +3.0 | −3.0 | No color distortion | No color distortion |
|  | 7 | 720 | +3.0 | +3.0 | No color distortion | No color distortion |
|  | 8 | 720 | −3.0 | −3.0 | No color distortion | No color distortion |
| Comparative Example | 19 | 720 | +4.6 | −4.6 | No color distortion | Color distortion occurred |
|  | 20 | 720 | +4.6 | +4.6 | No color distortion | Color distortion occurred |
|  | 21 | 720 | −4.6 | −4.6 | No color distortion | Color distortion occurred |
|  | 22 | 720 | +6.0 | −6.0 | No color distortion | Color distortion occurred |
|  | 23 | 720 | +6.0 | +6.0 | No color distortion | Color distortion occurred |
|  | 24 | 720 | −6.0 | −6.0 | No color distortion | Color distortion occurred |
|  | 25 | 720 | +12.0 | −12.0 | No color distortion | Strong color distortion |
|  | 26 | 720 | +12.0 | +12.0 | No color distortion | Strong color distortion |
|  | 27 | 720 | −12.0 | −12.0 | No color distortion | Strong color distortion |
|  | 28 | 720 | +17.0 | −17.0 | No color distortion | Strong color distortion |
|  | 29 | 720 | +17.0 | +17.0 | No color distortion | Strong color distortion |
|  | 30 | 720 | −17.0 | −17.0 | No color distortion | Strong color distortion |
|  | 31 | 720 | +27.0 | −27.0 | No color distortion | Strong color distortion |
|  | 32 | 720 | +27.0 | +27.0 | No color distortion | Strong color distortion |
|  | 33 | 720 | −27.0 | −27.0 | No color distortion | Strong color distortion |
|  | 34 | 720 | +40.6 | −40.6 | No color distortion | Strong color distortion |
|  | 35 | 720 | +40.6 | +40.6 | No color distortion | Strong color distortion |
|  | 36 | 720 | −40.6 | −40.6 | No color distortion | Strong color distortion |

TABLE 3

|  |  | In-plane retardation (nm) | Angle of slow axis with respect to TD axis (°) | | Visual sensation without sunglasses | Visual sensation with sunglasses |
|---|---|---|---|---|---|---|
|  |  |  | First protective film | Fourth protective film |  |  |
| Example | 9 | 954 | +1.0 | −1.0 | No color distortion | No color distortion |
|  | 10 | 954 | +3.0 | −3.0 | No color distortion | No color distortion |
|  | 11 | 954 | +3.0 | +3.0 | No color distortion | No color distortion |
|  | 12 | 954 | −3.0 | −3.0 | No color distortion | No color distortion |
| Comparative Example | 37 | 954 | +4.6 | −4.6 | No color distortion | Color distortion occurred |
|  | 38 | 954 | +4.6 | +4.6 | No color distortion | Color distortion occurred |
|  | 39 | 954 | −4.6 | −4.6 | No color distortion | Color distortion occurred |
|  | 40 | 954 | +6.0 | −6.0 | No color distortion | Color distortion occurred |

TABLE 3-continued

| | In-plane retardation (nm) | Angle of slow axis with respect to TD axis (°) | | Visual sensation without sunglasses | Visual sensation with sunglasses |
| --- | --- | --- | --- | --- | --- |
| | | First protective film | Fourth protective film | | |
| 41 | 954 | +6.0 | +6.0 | No color distortion | Color distortion occurred |
| 42 | 954 | −6.0 | −6.0 | No color distortion | Color distortion occurred |
| 43 | 954 | +12.0 | −12.0 | No color distortion | Strong color distortion |
| 44 | 954 | +12.0 | +12.0 | No color distortion | Strong color distortion |
| 45 | 954 | −12.0 | −12.0 | No color distortion | Strong color distortion |
| 46 | 954 | +17.0 | −17.0 | No color distortion | Strong color distortion |
| 47 | 954 | +17.0 | +17.0 | No color distortion | Strong color distortion |
| 48 | 954 | −17.0 | −17.0 | No color distortion | Strong color distortion |
| 49 | 954 | +27.0 | −27.0 | No color distortion | Strong color distortion |
| 50 | 954 | +27.0 | +27.0 | No color distortion | Strong color distortion |
| 51 | 954 | −27.0 | −27.0 | No color distortion | Strong color distortion |
| 52 | 954 | +40.6 | −40.6 | No color distortion | Strong color distortion |
| 53 | 954 | +40.6 | +40.6 | No color distortion | Strong color distortion |
| 54 | 954 | −40.6 | −40.6 | No color distortion | Strong color distortion |

EXPLANATION OF REFERENCE NUMERALS AND SYMBOLS

10: first polarizing plate 20: second polarizing plate 30: display panel
101: first polarizer 102: first protective film 103: second protective film
201: second polarizer 202: third protective film 203: fourth protective film
TD, $TD_1$, $TD_2$: TD axis; S(+), S(−), $S_1$(+), $S_1$(−), $S_2$(+), $S_2$(−): slow axis
a(+), a(−), $a_1$(+), $a_1$(−), $a_2$(+), $a_2$(−): angle formed by slow axis with respect to TD axis
40: polarized sunglasses 401: left eye lens 402: right eye lens V: viewing axis

The invention claimed is:

1. A display device comprising:
a display panel;
a first polarizing plate which is disposed on a viewing side of the display panel and comprises a first protective film, a first polarizer, and a second protective film sequentially; and
a second polarizing plate which is disposed on an opposite side of the viewing side of the display panel and comprises a third protective film, a second polarizer, and a fourth protective film sequentially,
wherein the second and third protective films are disposed close to the display panel side, and the first and fourth protective films are disposed outside the display device,
wherein the first protective film and the fourth protective film are each a protective film for preventing color distortion and each is a polyethylene terephthalate film, and each has an angle formed by a slow axis of the protective film with respect to a TD (transverse direction) axis of the protective film in a range of 0 to 4.5 degrees, wherein the slow axis means an axis with the highest refractive index on a surface of the protective film, and
wherein the protective film for preventing color distortion has an in-plane retardation value (Rin) of 300 nm to 400 nm for light having a wavelength of 550 nm, and
wherein the second protective film and the third protective film are each a TAC (triacetyl cellulose) film.

2. The display device according to claim 1, wherein the protective film for preventing color distortion has an angle formed by the slow axis with respect to the TD axis in a range of 0 to 3 degrees.

3. The display device according to claim 1, wherein the protective film for preventing color distortion has an in-plane retardation value (Rin) for light having a wavelength of 550 nm of 10 nm to 1000 nm.

4. The display device according to claim 1, wherein in the protective films for color-distortion prevention, the difference in absolute values of the angles formed by the slow axes of the respective protective films with respect to the TD axes is 3.5 degrees or less.

5. The display device according to claim 1, wherein in the at least two protective films for preventing color distortion, the TD axes of the respective protective films are orthogonal to each other.

6. The display device according to claim 1, wherein the display panel comprises a liquid crystal panel.

7. The display device according to claim 1, wherein a magnitude of the angle formed by a slow axis of the protective film with respect to a TD axis of the protective film in the first protective film and the fourth protective film are equal to each other.

* * * * *